United States Patent Office 2,888,096
Patented May 26, 1959

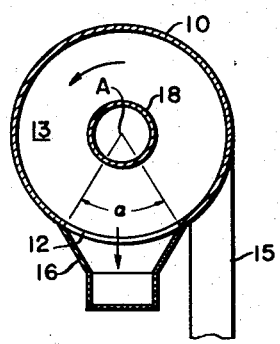
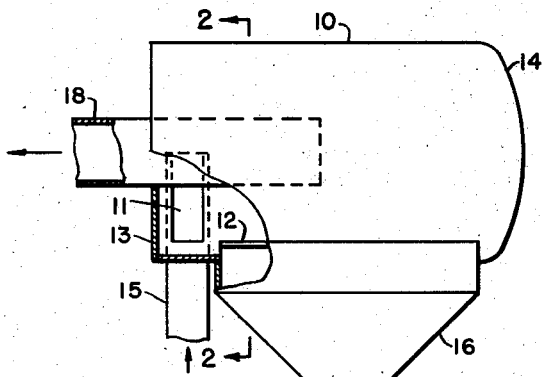
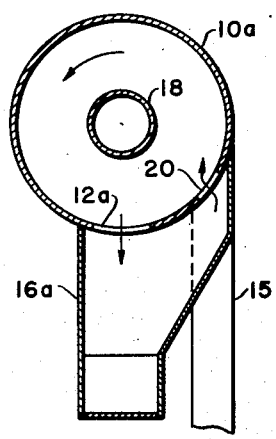
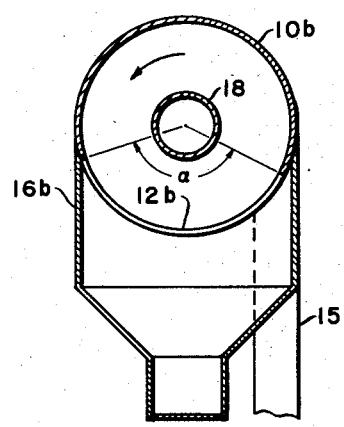
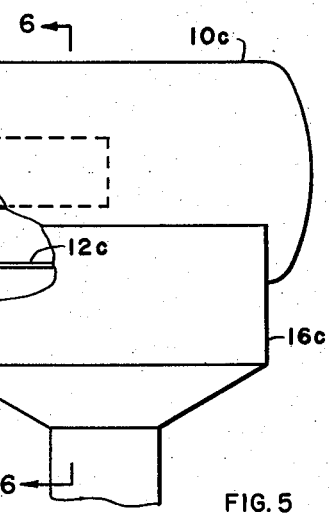
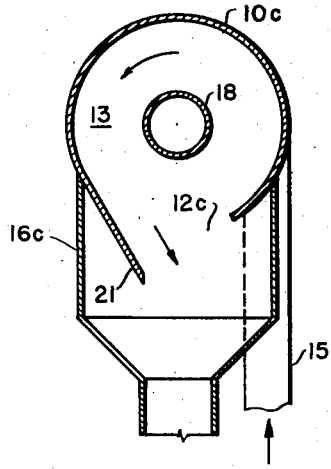

2,888,096
HORIZONTAL CENTRIFUGAL SEPARATOR

Harry D. Evans, Oakland, Calif., assignor to Shell Development Company, New York, N.Y., a corporation of Delaware Application June 22, 1955, Serial No. 517,242

1 Claim. (Cl. 183—80)

The invention relates to stationary centrifugal separators including a centrifugation chamber disposed with a horizontal axis into which the mixture to be separated, such as a suspension of liquid or solid particles in a fluid of lower density, e.g., a suspension of dust or catalyst in a gas, such as air or hydrocarbon vapor ("gas" being used generically to include vapor), is fed tangentially to effect separation by centrifugal force. The invention is, more particularly, concerned with an improved arrangement of the inlet duct and with improved features of the underflow and overflow outlets.

A stationary centrifugal separator of the type herein considered includes an enclosed centrifugation chamber at least the top of which conforms generally to a surface of revolution about a horizontal axis, said chamber having one or more tangential inlets for admitting the mixture to be separated with a flow direction producing circumferential or vortical motion thereof about the said horizontal axis, an axial overflow outlet for the fluid of lower density, which moves toward the axis, and an underflow outlet opening formed in the enclosing wall at a level below the said axis for discharging the separated particles. Such separators are sometimes classified as cyclones and whirl chambers, most features of the invention being applicable to both types: In a cyclone the tangential inlet is situated near one end of the chamber and the axial overflow outlet is also situated at this end, being usually formed by a vortex-finder tube that extends into the chamber for a part of the length thereof. In the whirl chamber the overflow outlet is situated remotely from the inlet opening. From the foregoing description it is clear that the cyclone operates on the countercurrent principle (in that the fluid of lower density, after initial travel with the particles in an axial direction away from the inlet, reverses direction to enter the overflow outlet) and the whirl chamber on the parallel-flow principle.

The use of stationary centrifugal separators for effecting a separation between a gas and a liquid or solid suspended therein has been known for years. An example is the separation of hydrocarbon gases from catalyst particles in the upper part of the reactor of a catalytic cracking plant, wherein a conventional cyclone is generally used.

Considered spatially, the separator is usually situated at a level above the source of the suspension; this is true in reactors and regenerators of catalytic cracking plants as well as in fluid bed furnaces using sand as a heat-transmitting medium. Thus, in reactors or regenerators the separator is mounted at a level higher than the fluidized bed because the suspension being separated ascends from such bed and also for the purpose of insuring a head for the return of the separated catalyst to the bed or to an engagement device wherein the catalyst is picked up by a gas stream and transported to another unit of the plant. Similarly, in riser-reactors, wherein a chemical reaction of hydrocarbon vapors occurs while the vapors ascend through a duct together with suspended catalyst, the separation is effected at the top of the riser to facilitate flow of the separated solids to the source or to another vessel by gravitation. Another spatial consideration is that the tangential inlet ducts to the centrifugation chambers of the known types of separators are substantially horizontal, the chamber axis being in practice almost universally vertical. Even in proposals for mounting the cyclone in a horizontal position (see, e.g., British Patent 366,926) the tangential inlet duct is made to enter horizontally, since it appeared that a vertical, upward inlet duct would cause operating difficulties, such as the fall-back of catalyst from the centrifugation chamber into the duct leading to irregular operation and/or poor separation due to abnormally high concentration of particles in the separator near the inlet and resultant undesirable eddy currents within the chamber. These two spatial factors have heretofore necessitated an almost right-angled bend in the inlet duct to the separator.

Such prior arrangements, employing bends, present practical difficulties. If, for instance, the separator is used to separate suspended solids from a gas, considerable erosion is caused by the solids. In this case, as well as when liquid particles are dealt with, there is a significant pressure drop across the bend in the inlet duct, which limits the flow rate and is wasteful of power. Processwise, such installations have detrimental effects on catalytic reactions since segregation of catalyst due to flow through the bends and/or settling of catalyst in the horizontal inlet duct results in non-uniform distribution of catalyst in the reactant and non-uniform residence time.

Centrifugal separators with horizontal axes constructed in accordance with known designs further do not achieve maximum separating efficiencies. Applicant has found that deposition of separated particles at the low parts of the centrifugation chamber often occurs and that irregularities in the contour of the chamber wall, particularly at the edges of outlet openings having inwardly- and outwardly-bent edges, disturb the flow patterns and detract from the separating efficiency. Moreover, it was found that the length of the vortex-finder tube often significantly affects the separating efficiency of horizontal cyclones with elongated underflow outlets.

It is an object of this invention to provide an improved stationary centrifugal separator mounted with a substantially horizontal axis wherein the aforementioned bend in the inlet duct is avoided.

A further object is to provide a stationary horizontal centrifugal separator of improved design and contour in regard to the shape of the enclosing wall and the underflow outlet opening formed in said wall.

Still another object is to provide a horizontal cyclone having an underflow outlet opening formed in the side wall and elongated in the axial direction, said cyclone having a vortex-finder tube of such a length as to achieve improved separating efficiency.

In summary, the horizontal separator according to the invention may include any of the following features, which are preferably combined:

(1) The centrifugation chamber includes a riser feed duct the upper end of which opens upwardly into the chamber substantially tangentially to the chamber wall, the chamber having an axial overflow outlet, at least the upper part of the chamber wall being shaped generally as a surface of revolution about a horizontal axis, and said wall having an underflow outlet opening that is elongated in the direction of said axis (the opening being continuous or interrupted) and is situated below said axis, whereby the suspension admitted upwardly into the chamber completes a reversal of flow direction along said wall before flowing past the level of said axis in a downward direction, and the suspension flows past said underflow outlet opening during the next 180° of peripheral flow, whereby particles accumulated near the wall are promptly discharged during the first cycle of rotation. The fluid continues its movement to complete one or more subsequent cycles of rotation during which additional separation of particles usually occurs.

(2) The second feature is applicable to centrifugation chambers with enclosing walls shaped generally as surfaces of revolution about horizontal axes, regardless of whether the tangential inlet duct is vertical. According to this feature the enclosing wall has an underflow outlet opening that is elongated in the axial direction and formed as a gap in the wall that subtends at the said axis a dihedral angle between about 10° and 180°; moreover, it is preferred to shape all parts of the enclosing wall to conform to a surface of revolution (in contrast to providing louvers or to bending the downstream edge of the exit slot radially inwards as in the prior art), thereby to avoid eddy currents that were found to affect the separation efficiency adversely. The size of the gap, which may be more or less rectangular in outline and which may be longitudinally continuous or interrupted, will depend upon the loading, viz., upon the quantity of particles to be removed, and upon the chamber diameter, somewhat smaller dihedral angles being used with large-diameter chambers. It is desirable to locate the gap to include the part of said surface of revolution directly beneath the axis, to prevent accumulation of particles and induce all separated particles to fall down into the collecting hopper that is applied externally to the chamber. In addition to the main underflow opening there may be additional openings or slots, elongated in the axial direction or in an inclined or circumferential direction, establishing additional direct communication between the chamber and hopper. Such additional slots permit fluid from the hopper to re-enter the chamber, and are advantageously situated in spaced relation to the said main underflow opening in the peripheral direction of fluid flow at a part whereat the fluid is ascending.

(3) When the horizontal separator is constructed as a cyclone with an axial vortex-finder tube entering from the end of the chamber near which the tangential inlet is located, the length of the vortex-finder tube is made sufficiently long to extend beyond the inlet opening by a distance at least one-half the axial dimension of said inlet opening, but not longer than half the length of the centrifugation chamber. This feature is likewise useful regardless of the inclination of the tangential inlet duct.

The invention will be further described with reference to the accompanying drawing forming a part of this specification and showing certain preferred embodiments, wherein:

Figure 1 is an elevation view through a horizontal cyclone in accordance with the invention, parts being shown in section;

Figure 2 is a transverse sectional view taken on the line 2—2 of Figure 1;

Figures 3 and 4 are transverse sectional views corresponding to Figure 2 but showing two variants;

Figure 5 is an elevation view, partly in section, of an additional variant; and

Figure 6 is a transverse sectional view taken on the line 6—6 of Figure 5.

Referring to Figures 1 and 2 of the drawings in detail, 10 denotes the enclosing wall of a centrifugation chamber having the shape of a cylinder with a horizontal axis, except for an inlet opening 11 near one end and an underflow discharge opening 12 situated wholly below the central axis A of the chamber. The openings may be rectangular in shape and elongated in the axial direction, as shown. The underflow discharge opening is shown to be a gap that subtends a dihedral angle α at the axis A of about 63°, but other angles, from 10° to 180°, may be used. The underflow discharge opening in this embodiment does not extend the full length of the chamber but one end thereof is terminated just short of the end zone where the inlet opening 11 is situated. The other end may extend substantially to the end of the wall 10. The ends of the chamber are provided with closures 13 and 14. A vertical riser duct 15 is connected to the opening 11 substantially tangentially to the wall 10 for admitting the mixture to be separated with an upward motion. A hopper 16 may be mounted externally of the chamber opposite the underflow discharge opening 12 to receive particles discharged through the said opening and direct them into a vertical discharge duct 17. The axial overflow outlet includes a vortex-finder tube 18 that extends through a central opening in the end closure 13. The tube 18 should extend into the chamber beyond the inlet opening 11 for a distance at least half the dimension of the opening in the axial direction. With certain types of underflow openings (especially when α is large, e.g., 90°–180°) and with some loadings it was found that there is a length for the vortex-finder tube that should not be exceeded if optimum separating efficiencies are to be attained; this length is half the length of the chamber 10.

As applied, for example, to the separation of fine solids such as sand or catalyst from a gas, the initial suspension is admitted through the inlet duct 15 in an upward direction tangentially to the wall 10 to form a vortex. During the first cycle of rotation the suspension moves first upwards and makes a complete reversal of flow direction before moving downwards past the level of the axis. The fluid is displaced in an axial direction away from the inlet (left) end, so that it assumes a helix-like path to move past the opening 12 during the first cycle of rotation. All or part of the suspended particles are flung against the chamber wall by centrifugal force and pass through the underflow opening 12 into the hopper 16 during the first cycle. The duct 17 is provided with suitable flow-control means (not shown, but known per se, e.g., a valve or fluidized sealing device) for maintaining the level of particles therein at a desired height, indicated at 19; this blocks the outflow of any significant amount of the gas from the centrifugation chamber through the hopper 16. Instead, the gas continues its rotary movement beyond the opening 12 to complete one or more cycles of rotation, during each of which additional particles are hurled against the wall 10 and separated through the opening 12. The gas thereafter makes a change of direction and flow into the vortex-finder tube 18.

It will be noted that the operation may be visualized as a succession of cycles of rotation in each of which the suspension moves upwards along the wall 10 and makes a complete change in flow direction to separate particles by centrifugal force, and the separated particles are drawn off through the elongated underflow opening 12 during the succeeding 180° of rotation of the fluid. In this way the quantity of suspended particles that is carried in an upward direction is always held at a minimum and very complete separations—well over 99%—can be attained. The gap constituting the opening 12 is wide enough to discharge the particles into the hopper without the need to bend the downstream edge (the right edge in Fig. 2) of the opening inward; this results in smoother flow and increased separating efficiency.

By arranging the duct 15 vertically or substantially so the need for a bend in the riser is eliminated and the difficulties noted above are avoided. It was found, contrary to expectation, that the separator operates smoothly and with high efficiencies despite the unusual flow conditions prevailing in the riser feed duct and just inside the chamber. It should be observed that in the duct 15 the particles are settling or slipping relatively to the ascending fluid stream and so enter the centrifugation chamber at a lower velocity than that of the fluid. By arranging the underflow opening 12, elongated in the axial direction as described, the separated particles were effectively removed and there was no tendency for fall-back of such particles into the tangential feed duct. Also, the particles are distributed more or less uniformly across the area of the inlet duct 15; this condition is desirable for effecting good contact, but is usually regarded as undesirable for good separation efficiency in comparison with the condition found in prior arrangements, wherein the entering suspended matter is concentrated near the outer wall. However, high separating efficiencies were attained, as shown by the data in the examples.

Reduced pressure drop is attained not only because the bend in the riser is eliminated but also because of the lower inlet velocity of the suspended particles, as noted in the preceding paragraph. Since the pressure drop within the centrifugation chamber is related to the total kinetic energy of the entering stream (including fluid and suspended matter) it is evident that a lower velocity of the particles, causing a lower total kinetic energy for a given fluid velocity, results in reduced pressure drop. Also, by avoiding a horizontal inlet duct sedimentation of particles therein and resulting partial obstruction, leading to sporadically high fluid velocities, are obviated.

Processwise the arrangement is highly advantageous particularly in the case of a riser-reactor, wherein the reaction occurs within the gas flowing through the duct 15 and the entrained particles are catalyst. In this arrangement the uniform distribution of the catalyst in the gas is maintained until the actual centrifugal separation, without any opportunity for the catalyst to become segregated, thereby causing good, uniform contact between gas and catalyst. Also, within the chamber 10 the separation occurs rapidly, largely during the first cycle of gas rotation and without opportunity for deposition and accumulation of catalyst on the bottom of the wall, thereby promoting a more uniform residence time within which the gas and catalyst are in contact.

Other arrangements of the separator are possible and will be described. In all subsequent views the construction is as described for Figures 1 and 2, unless otherwise noted, and like reference numbers denote like parts.

Considering the variant of Figure 3, the hopper 16a is wider at the top than in the first embodiment and the wall 10a has a plurality of gaps, which may be coextensive in the axial direction over the part of the cyclone occupied by the opening 12 of Figure 1. Thus, there is provided, in addition to the main underflow discharge opening 12a, which subtends an angle between 10° and 90° at the axis, an auxiliary elongated gap 20 situated in spaced relation to the opening 12a at a part of the wall 10a whereat the fluid flow is upward and away from the opening 12a. The auxiliary opening permits fluid, e.g., gas, that enters the hopper 16a through the opening 12a with the particles to return into the centrifugation chamber, while permitting smooth circulation of the fluid within the centrifugation chamber.

In Figure 4 the underflow outlet opening 12b is a gap in the wall 10b subtending an angle α of about 135°, the upper edge of the gap being at the level of the axis at a part of the wall whereat the stream is moving downwards. The hopper 16b is made wider to accommodate the wider gap. This construction has the advantage of simplicity in construction and low cost.

Considering Figures 5 and 6, the hopper 16c is made deeper and a baffle plate 21 is provided at the upstream edge of the gap 12c tangentially flat to the chamber wall 10c and extends downward into hopper. This baffle 21 is advantageously situated wholly within the dihedral angle subtended by the gap, preferably within the upstream half of that angle, as shown; it may, of course, be integral with the wall 10c, as shown. This construction permits a wide gap to be used for handling large quantities of suspended solids with a minimum of interference with the smooth flow pattern of the gas within the centrifugation chamber. In this embodiment the underflow outlet gap extends through the full length of the centrifugation chamber, the hopper being similarly lengthened as shown in Figure 5. This feature is applicable also to the earlier-described embodiments.

EXAMPLE I

A series of separations was made in a horizontal cyclone constructed in accordance with Figures 1 and 2, having the following dimensions:

| | |
|---|---:|
| Diameter of centrifugation chamber _____in__ | 7 |
| Length of centrifugation chamber _____in__ | 12 |
| Underflow outlet—subtended gap angle __degrees__ | 26 |
| Underflow outlet—length of gap _____in__ | 9 |
| Axial dimension of tangential inlet _____in__ | 2 |
| Vortex-finder tube length _____in__ | 5.63 |
| Vortex-finder internal tube diameter _____in__ | 2 |

The suspension consisted of air containing varying amounts of solid catalyst consisting mainly of particles with diameters between 20 and 200 microns and having an apparent density of 1.5 grams per cc. and a bulk density of about 40 lbs. per cu. ft. Different air inlet velocities were used. Results are shown in Table I:

*Table I*

| Air Inlet Velocity, ft. per sec. | Cyclone Feed Rate, lbs. of Catalyst per cu. ft. of Air | Percent Solids Unseparated (Present in Exit Air) |
|---|---:|---:|
| 19 | 1.1 | 0.22 |
| 19 | 2.1 | 0.42 |
| 19 | 3.0 | 0.2 |
| 34 | 0.75 | 0.02 |
| 34 | 1.4 | <0.1 |
| 34 | 2.2 | 0.48 |
| 53 | 0.45 | 0.085 |
| 53 | 0.98 | 0.076 |
| 53 | 1.1 | 0.047 |

It is evident that separating efficiencies between about 99.5 and 99.98% were obtained. This model tended toward higher separating efficiencies at lower catalyst feed rates.

EXAMPLE II

A cyclone constructed as shown in Figure 3 and having the dimensions stated for Example I (save that the main underflow outlet gap subtended a dihedral angle of 13° with the center of gap situated about 23° upstream of the vertical plane through the axis) was tested to separate suspended catalyst as described above from air. The auxiliary opening had the same size as the main opening. Results are shown in Table II:

*Table II*

| Air Inlet Velocity, ft. per. sec. | Cyclone Feed Rate, lbs. of Catalyst per cu. ft. of Air | Percent Solids Unseparated (Present in Exit Air) |
|---|---:|---:|
| 19 | 1.1 | 0.26 |
| 19 | 2.3 | 0.29 |
| 34 | 0.63 | 0.18 |
| 34 | 1.3 | 0.09 |
| 34 | 1.9 | 0.06 |
| 53 | 0.41 | 0.69 |
| 53 | 0.99 | 0.20 |

Again extremely high separating efficiencies, between about 99.3 and 99.94%, were attained. It may be noted that while in Example I the separating efficiencies tended to increase with decreased solids feed rate to the cyclone, in this example the efficiencies increased with increased solids feed rate.

EXAMPLE III

A semi-cyclone, constructed as shown in Figure 4 and having the dimensions stated for Example I (save that the underflow outlet gap subtended a dihedral angle of 150°, situated 75° on each side of the vertical plane through the axis, and that various lengths of vortex-finder tubes were used in some runs) was tested to separate the suspended catalyst as described above from air. The air inlet velocity was 50 ft. per second. Results were as indicated in Table III:

Table III

| Length of Vortex-Finder Tube, in. | Cyclone Feed Rate, lbs. of Catalyst per cu. ft. of Air | Percent Solids Unseparated (Present in Exit Air) |
|---|---|---|
| 2.4 | 0.4 | 2.1 |
| 2.4 | 1.2 | 1.3 |
| 2.4 | 1.9 | 0.88 |
| 6 | 0.4 | 6.6 |
| 6 | 2.1 | 1.3 |
| 6 | 2.2 | 1.1 |

These data show the same trend of efficiencies in relation to solids feed rate as Example II. They further show that with this construction decreased efficiencies are attained when longer vortex-finder tubes are used.

I claim as my invention:

A stationary centrifugal separator for separating suspended particles comprising: a wall enclosing a centrifugation chamber at least the upper part of which is shaped substantially as a surface of revolution about a horizontal axis, said wall having an axially restricted inlet opening near one end in the side and below the mid-height thereof and an underflow outlet gap at the bottom of the enclosing wall subtending a dihedral angle between 10° and 90° at said axis, and providing a straight-line and unobstructed discharge path for said particles from said wall in a direction which is tangential thereto; a riser feed duct the upper end of which opens upwardly into said chamber through said inlet opening tangentially to said wall; an axially disposed, peripherally closed, open-ended overflow outlet tube extending into said chamber from the said end thereof beyond the said inlet opening; a hopper for receiving particles discharged from said underflow outlet opening; and an outlet for said hopper; said wall having an additional opening elongated in the axial direction establishing direct communication between said hopper and the centrifugation chamber and situated in circumferentially spaced relation to said underflow opening in a part of said wall whereat the peripheral flow direction of the fluid within the chamber is upwards and away from said underflow opening.

References Cited in the file of this patent

UNITED STATES PATENTS

| 4,048 | Sweet | May 13, 1845 |
| 4,069 | Grimes | June 7, 1845 |
| 474,490 | Walter | May 10, 1892 |
| 1,838,117 | Simms et al. | Dec. 29, 1931 |
| 1,953,948 | Bieth | Apr. 10, 1934 |
| 2,103,809 | Bieth | Dec. 28, 1937 |
| 2,170,704 | Bourne | Aug. 22, 1939 |
| 2,322,414 | Bowen | June 22, 1943 |
| 2,323,405 | Linderoth | July 6, 1943 |
| 2,672,871 | Slovic | Mar. 23, 1954 |

FOREIGN PATENTS

| 255,948 | Switzerland | Feb. 1, 1949 |